May 30, 1939.    E. C. HORTON    2,160,737
WINDSHIELD CLEANER SYSTEM
Filed June 10, 1937
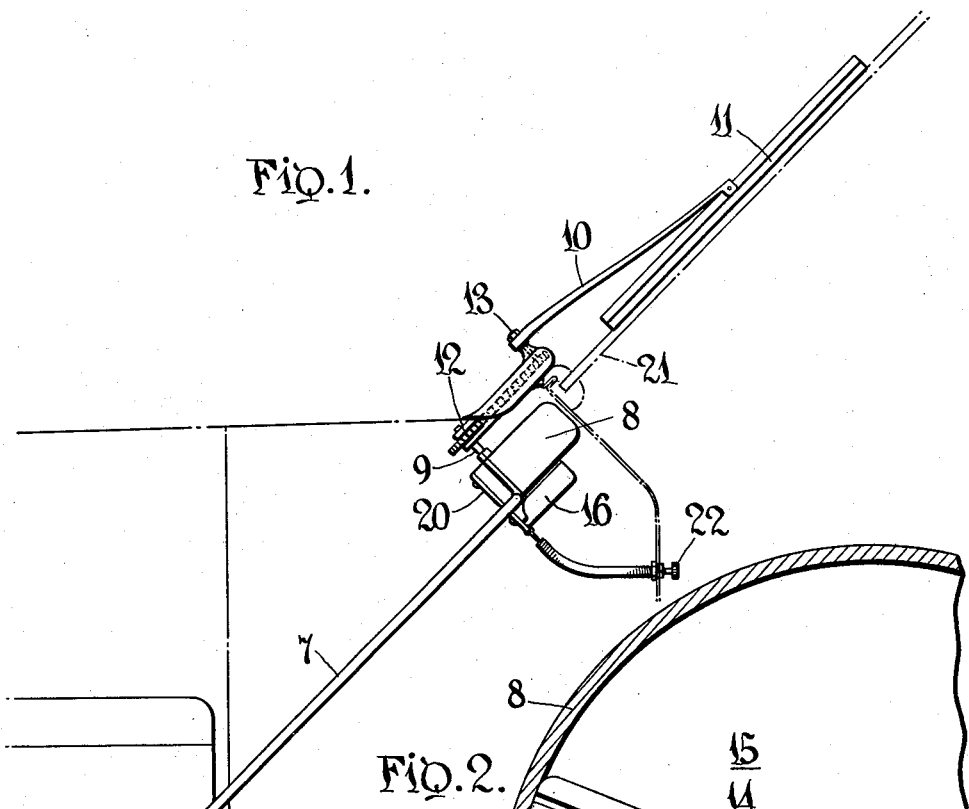
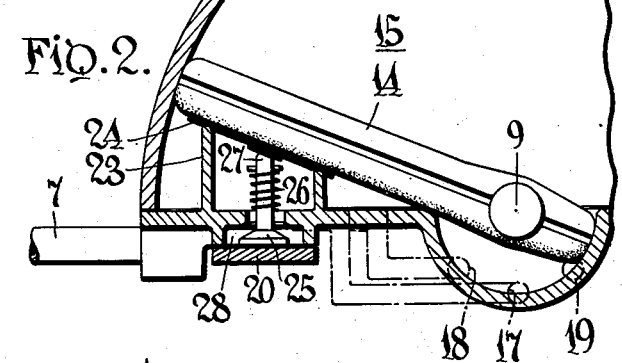
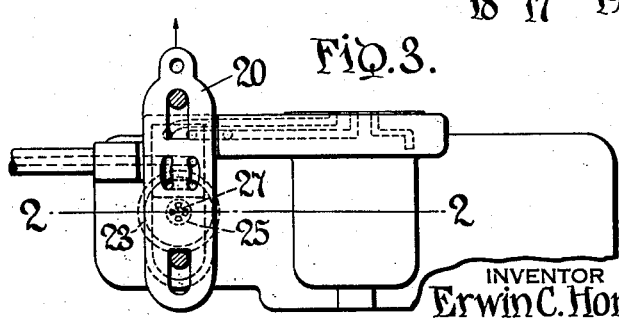
INVENTOR
Erwin C. Horton,
BY
Beau, Brooks, Buckley & Beau.
ATTORNEYS Patented May 30, 1939

2,160,737

UNITED STATES PATENT OFFICE 2,160,737

WINDSHIELD CLEANER SYSTEM

Erwin C. Horton, Hamburg, N. Y., assignor to Trico Products Corporation, Buffalo, N. Y.

Application June 10, 1937, Serial No. 147,506

8 Claims. (Cl. 60—60)

This invention relates to an accessory or windshield cleaner system for motor vehicles in which the fluid pressure differential utilized for operating the cleaner motor is developed from a moving part of the vehicle. It has heretofore been proposed to utilize an air pump for supplying suction as well as positive pressure for the actuation of the motor of the accessory. This has necessitated a disconnectible transmission between the pump and the engine, or other driving part, of the vehicle and consequently involved its installation as well as keeping it in repair.

The present invention has for its object to provide an efficient windshield cleaner system having an air pump as a source of operating pressure wherein it is unnecessary to disconnect the pump from its drive either automatically or manually. The invention further resides in the provision of a windshield cleaner wherein the wiper may be pneumatically moved to a parked position and then the motor relieved of excessive pressure to avoid injury to the frail motor by the constant application of the full pressure when the motor is at rest.

In the drawing

Fig. 1 is a diagrammatic view disclosing a windshield cleaner embodying the present invention;

Fig. 2 is a fragmentary sectional view through the venting arrangement of the accessory motor; and Fig. 3 is a view of the motor showing the porting arrangement of the control valve.

Referring more in detail to the accompanying drawing, numeral 1 designates a pressure generator preferably in the form of a low pressure pump mounted on the motor vehicle engine 2 and is shown as comprising a fluid displacing diaphragm 3 reciprocated by an eccentric 4 driven from the engine to intake air through the inlet connection 5 and discharge it through the openings 6 in the pump housing, this construction being more particularly shown in my copending application Serial No. 129,027, filed March 4, 1937. The inlet 5 is connected by the suction or low pressure line 7 to the motor 8 of an accessory which is illustrated as a windshield cleaner and has a shaft 9 acting through an arm 10 to reciprocate the wiper 11. The shaft 9 may be connected directly to the arm 10 or, as illustrated, by means of an intermediate transmission 12 to an arm carrying stub shaft 13.

The fluid operated member or piston 14 of the motor operates within the chamber 15 and is connected to the shaft for imparting oscillatory motion thereto. The pressure differential is operatively applied to the moving element of the motor by a valve mechanism, generally indicated at 16, which serves to alternately connect the suction supply port 17, first to the port 18 and then to the port 19 communicating with the chamber 15 at opposite sides of the piston. The unconnected port is opened to the atmosphere to provide the necessary pressure differential for actuating the piston. The suction supply port 17 is brought into communication with the suction line 7 by the control valve 20.

The windshield cleaner motor is preferably disposed at the lower side of the windshield 21, and when it is desired to arrest the wiper the control valve 20 is moved to its closed position shown in Fig. 3, as by the extension handle 22, so as to close communication between the suction supply port 17 and the suction line 7 and shunt out the automatic valve action by means of a direct communication between the chamber 15 and the suction line at one side only of the piston. The port arrangement to reverse the pressure differential to operate the motor as well as for parking the wiper is substantially the same as that shown in Patent No. 1,840,233, granted January 5, 1932, to Henry Hueber. The suction is applied to the near side of the piston 14 through a biased seat 23 which is disposed slightly beyond the normal running range of the fluid displacing member or piston, as defined by the automatic valve mechanism 16, but is adapted to be engaged by the piston, or a sealing member 24 carried thereby, when the wiper is being moved to a parked position. This member 24 serves to seal the space within the seat 23 from the remaining portion of the piston chamber 15 and thus confines the surface or area to which the suction is connected when the wiper is in its parked position.

In accordance with the present invention, means are provided to vent the suction line to the atmosphere for a limited bleeding action so as to restrict the effect of the continuous operation of the pump on the exposed parts of the light motor. This is permissible because gravity will assist in hold the wiper down at the lower edge of the windshield. To this end a valve 25 normally held closed by a spring 26 is unseated as the piston moves to the parking seat 23. This may be accomplished by having the piston engage the valve stem 27 which serves to open the space within the parking seat to the atmosphere through a valve chamber 28 which has restricted communication to the atmosphere. This atmospheric communication from the chamber 28 may be through one of the control valve ports or through the space provided between the chamber wall and the control valve 20 shown in Fig. 2. Thus, the pump may continue to operate full time without injury to the pump or the accessory by reason of an excessive amount of low pressure, since the suction line is partially vented and only sufficient suction supplied to the accessory motor to hold the wiper parked.

From the foregoing it will be observed that the suction generator 1 may be permanently positioned on and connected to the vehicle engine for continuous operation thereby, and that the cleaner may be stopped or parked in a normal manner, without fear of injury to the cleaner or any part of its system by the continuous application of suction thereto, since the suction line is vented within certain limits of safety in an automatic manner. When the control valve is moved to its open position, the parking suction is removed and operating suction is applied to the remote side of the piston whereby the latter will move from the seat 23 and permit the venting valve 25 to close under the urge of the spring 26.

The foregoing disclosure is illustrative of the inventive principles herein contained, which latter may be incorporated in other physical embodiments without departing from the spirit or scope of the invention claimed.

What is claimed is:

1. A windshield cleaner system for motor vehicles, comprising a suction generator continuously operable by and during operation of the vehicle engine, a wiper, a suction operated motor connected by a suction line to the generator and operable to move the wiper on the windshield, a control valve for starting and stopping the operation of the motor, and means operable by the motor for partially venting the suction line to relieve the latter of excessive suction when the generator is operating and the suction operated motor is at rest.

2. An accessory system for motor vehicles, comprising a suction generator, means for continuously operating the same from the vehicle engine, a suction operated accessory connected by a suction line to the generator, a control valve for starting and stopping the operation of the accessory, means for providing a restricted venting of the suction line to the atmosphere when the control valve is in its shut off position, and means operable by the accessory for actuating said venting means when the control valve is in its stopping position.

3. An accessory system for motor vehicles comprising a pressure generator continuously operable from the vehicle engine, an accessory having a motor with a member movable back and forth between two limit positions, means for connecting the generator alternately to the opposite sides of said movable member for reciprocating the same, valve means for closing communication between said connecting means and the generator to arrest the motor, means under the control of the valve means for connecting the chamber at one side directly to the generator independently of said applying means for actuating the movable member toward one limit position for parking the same, and means operable by a moving part of the motor when the movable member moves to its parked position for venting the chamber at such one side to restrict the pressure differential action on the movable member while the generator continues to operate.

4. An accessory for motor vehicles comprising a motor having a chamber and a member movable back and forth therein between two limit positions; automatic valve mechanism for reversing the pressure differential acting on said member, a control valve connecting said mechanism to a source of operating pressure and movable to a position for establishing direct communication between the source of pressure and the chamber at one side of the movable member exclusively of said mechanism, said movable member having an abnormal movement when said mechanism is excluded, and means operable by said movable member during its abnormal movement for restrictedly venting the chamber at such side of the movable member to determine the pressure differential acting on the latter.

5. An accessory for motor vehicles comprising a fluid actuated motor having a fluid actuated member and automatic valve mechanism for reversing the fluid pressure differential on the member for reciprocating the same, control valve means for opening and closing communication through the automatic valve mechanism to a source of pressure and when in a closed position directly connecting the motor exclusively of said valve mechanism for causing said member to move uni-directionally to a parked position, and means operable by said member during the final portion of its uni-directional movement to vent the direct communication when the member is in its parked position.

6. A windshield cleaner system for motor vehicles comprising a suction pump, a suction operated windshield wiper connected to the pump by a suction line, means for fluid locking the wiper in a parked position, and means operable by the windshield wiper for venting the suction line to the atmosphere to regulate the degree of fluid lock.

7. A windshield cleaner system for motor vehicles comprising an air pump operable from the vehicle power plant, an air operated windshield wiper connected to a pump by a conduit, means for arresting the wiper and holding it in a parked position by the continuous application of fluid pressure differential provided by the pump, and means operable by the windshield wiper for dissipating the pressure influence of the pump on the wiper to regulate the degree of holding pressure differential.

8. An accessory for association with a source of actuating pressure, comprising a motor with a member movable back and forth between two limit positions, means for operatively applying the actuating pressure to the opposite sides of said movable member for reciprocating the same, valve means for closing communication with the source of actuating pressure to arrest the motor, means under the control of the valve means for connecting the chamber at one side directly to the source of actuating pressure independently of said applying means for actuating the movable member toward one limit position for parking the same, and means operable by a moving part of the motor when the movable member moves to its parked position for venting the chamber at such one side to restrict the pressure differential action on the movable member.

ERWIN C. HORTON.